United States Patent [19]
Leschinger

[11] 4,058,670
[45] Nov. 15, 1977

[54] BURIED CABLE ENCLOSURE
[75] Inventor: Matthew L. Leschinger, Wauwatosa, Wis.
[73] Assignee: Utility Products Co., Milwaukee, Wis.
[21] Appl. No.: 684,750
[22] Filed: May 10, 1976
[51] Int. Cl.² .................... H02G 9/02; H02G 3/08; H02G 15/10; H05K 5/00
[52] U.S. Cl. ........................................ 174/38; 174/60
[58] Field of Search .................... 174/37, 38, 60; 220/3.8, 3.9, 3.92, 3.94, 18; 312/100; 150/7; 229/14 BE, DIG. 8

[56] References Cited
U.S. PATENT DOCUMENTS

| | | | |
|---|---|---|---|
| 3,373,276 | 3/1968 | Klein | 174/38 X |
| 3,714,369 | 1/1973 | Bunten | 174/38 |
| 3,740,452 | 6/1973 | Bunten | 174/38 |
| 3,796,820 | 3/1974 | Bunten | 174/38 |
| 3,864,510 | 2/1975 | Ramsey, Jr. et al. | 174/38 |
| 3,868,474 | 2/1975 | Bunten | 174/38 |
| Re. 27,746 | 8/1973 | Hamilton | 174/38 |

Primary Examiner—Laramie E. Askin
Attorney, Agent, or Firm—Quarles & Brady

[57] ABSTRACT

An enclosure for housing electrical apparatus associated with a buried cable assembly has a four-part construction in which a lower front cover is connected to a lower rear housing section, an upper rear housing section is secured to the lower rear housing section, and an upper front cover is attached to the upper rear housing section. A terminal mounting plate is pivotally attached to the upper housing section, and is movable between open and closed positions. When closed, the interior of the enclosure between the upper housing section and the upper cover is divided into front and rear compartments. The terminal mounting plate is normally locked in its closed position, with a special tool being required to unlock it to gain entry to cables, splices and terminals mounted behind the plate and to achieve access to a pair of bolts which secure the upper rear housing section to the lower rear housing section.

10 Claims, 8 Drawing Figures

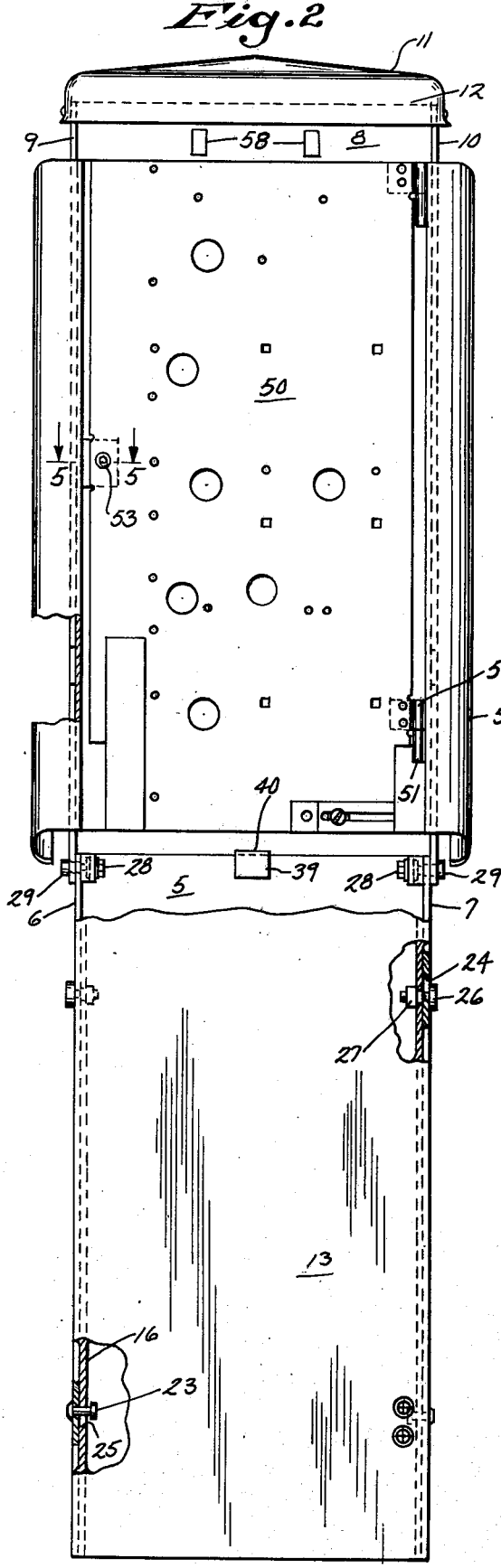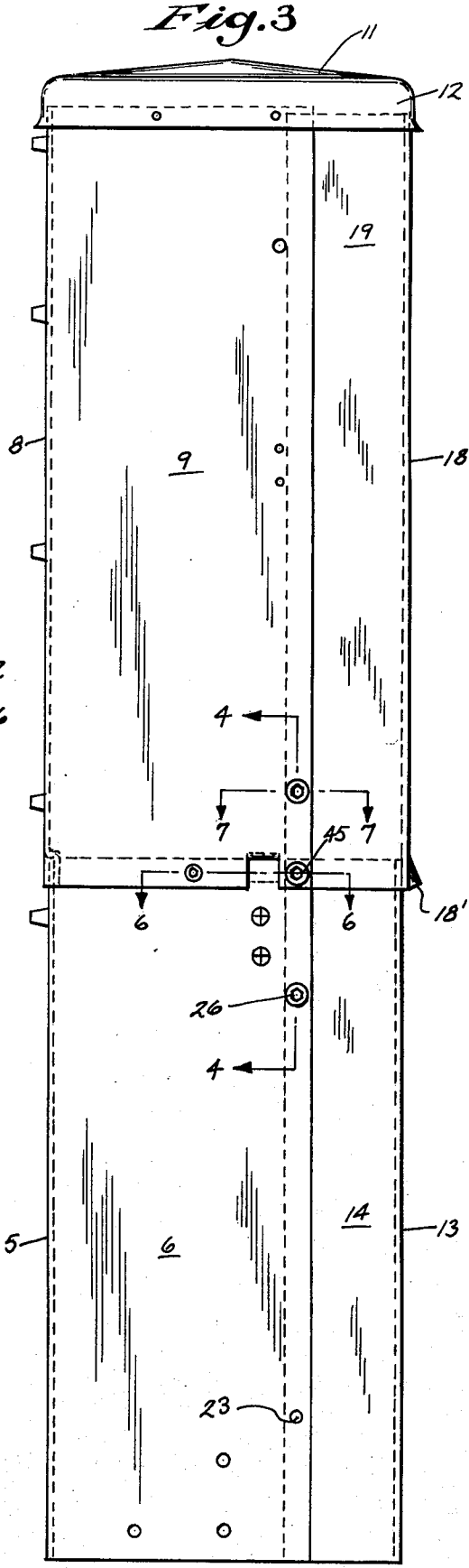

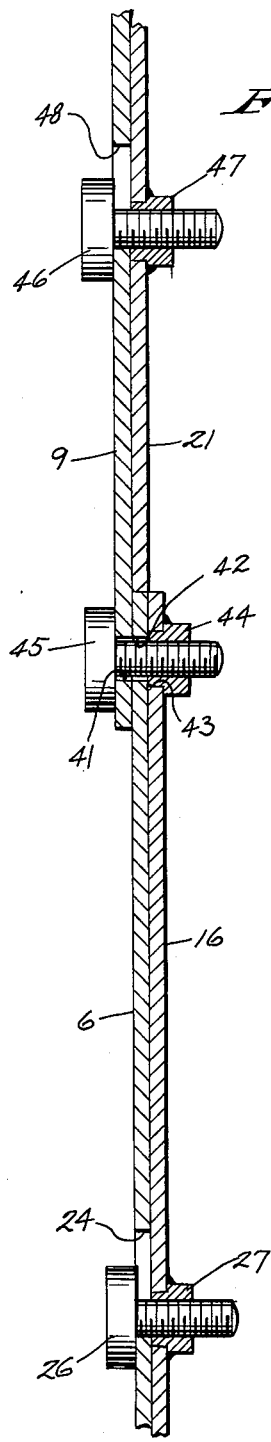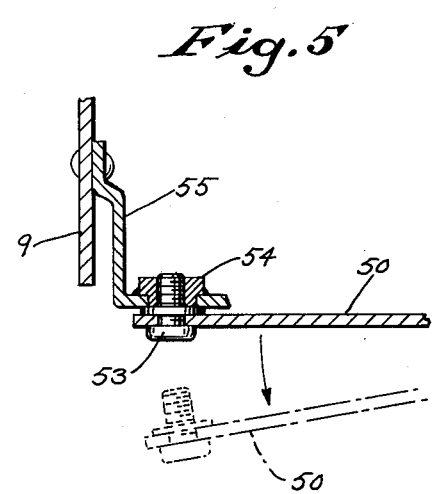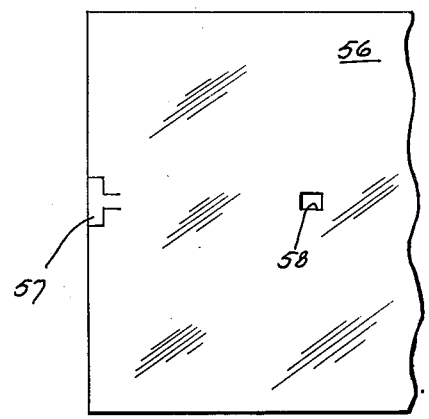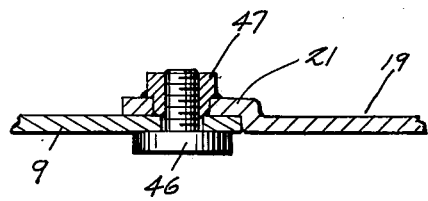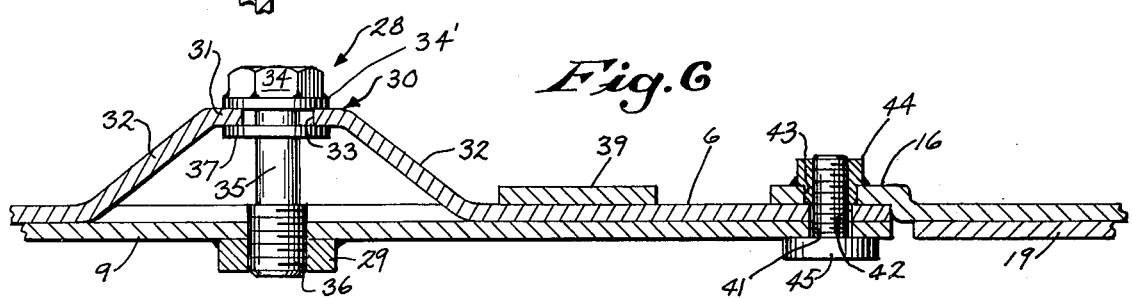

BURIED CABLE ENCLOSURE

BACKGROUND OF THE INVENTION

This invention relates to an enclosure for electrical apparatus, and more particularly to an enclosure for the above ground splices or terminals of a buried cable installation.

Enclosures are commonly provided to shelter splices or terminal connections between service wires or distribution wires, and buried utility cables such as telephone cables. It is important that such enclosures be substantially weather-tight to protect the connections from adverse weather conditions, e.g., the entry of damaging wind and precipitation. Also, a buried cable terminal enclosure should be sufficiently resistant to unauthorized entry to inhibit, or at least discourage, vandals from gaining access to the electrical circuitry and for unauthorized service personnel from altering those connections or splices which are not within their scope of responsibility.

On the other hand, the enclosure should be capable of ready disassembly both at the time of its installation and when needed for authorized service to alter connections or install or remove wires, cables or other instrumentalities. Typically, the enclosure will be shipped to its site in an assembled condition and then disassembled for installation. The tasks of making the original splices and terminal connections, and later altering or making additional connections both require maximum access to the wires and cables. Consequently, the enclosure should impede access as little as possible. The resulting cross purposes of easy disassembly by authorized persons, but difficult disassembly by others, are fulfilled by the enclosure of this invention.

The typical enclosure construction heretofore featured a three-part housing in which upper and lower front cover members were connected to a long, one-piece rear housing member, all three members being essentially U-shaped so that a hollow interior is formed. Examples of existing forms of enclosures are found in U.S. Pat. No. 3,740,452 issued June 19, 1973 to Bunten; U.S. Pat. No. 3,796,820 issued Mar. 12, 1974 to Bunten; U.S. Pat. No. 3,864,510 issued Feb. 4, 1975 to Ramsey, Jr., et al; U.S. Pat. No. 3,868,474 issued Feb. 25, 1975 to Bunten; and U.S. Pat. Re. No. 27,746 issued Aug. 28, 1973 to Hamilton. Enclosures of this type are usually partially buried with the lower front cover member and the lower half of the rear housing member substantially below ground level. With the rear housing in place, the installer can work from one side only in making the necessary connections. This can prove particularly troublesome when large cable is being prepared for splicing and is being spliced.

SUMMARY OF THE INVENTION

The present invention contemplates an improved buried cable terminal enclosure, and it specifically resides in an enclosure for electrical apparatus associated with a buried cable assembly in which a hollow housing is formed from a rear housing assembly including upper and lower channel-shaped housing sections removably joined together, a lower channel-shaped cover releasably attached to the lower housing section, and an upper cover section releasably attached to the upper housing section.

The present invention may further reside in the provision of such an enclosure in which each of the housing sections and the covers has a web and a pair of spaced flanges extending from the opposite sides of the web, and wherein the ends of the flanges of the lower housing section overlap the ends of the flanges of the lower cover and the bottom of the web and flanges of the upper housing section overlap the top of the web and flanges of the lower section, together with means for connecting the overlapping portions of the upper and lower housing section and lower cover to form a subassembly.

The present invention may also reside in a hollow enclosure for electrical apparatus associated with a buried cable assembly of the type wherein a hollow housing is formed by connecting front covers to a rear housing assembly comprising an upper housing section and a lower housing section; a mounting plate is removably attached to the upper housing section and divides the hollow interior into forward and rear compartments; headed bolts join the upper and lower housing sections together with the headed end of each bolt being disposed within the hollow interior and rearwardly of the mounting plate; and means are provided for locking the mounting plate in place to restrict access to the rear compartment and to the bolts.

A preferred form of the invention has a four-part enclosure with upper and lower front covers connected to upper and lower rear housing sections. When assembled with a cap that closes the top, there is partial overlap among the covers and sections to provide a substantially weather-tight enclosure. The upper rear housing section is secured to the lower rear housing section by a pair of bolts; and, it is a feature of the construction to have a terminal mounting plate mounted to the upper rear housing section to limit access to these bolts. To unfasten the bolts and thereby remove the upper housing section from the lower housing section, the terminal mounting plate must be unlocked and opened. This can be accomplished only by using a special tool. Hence, the attachment of the housing section is semipermanent, in the sense that during normal use and servicing the upper rear section is affixed to the lower rear section, and disassembly is achieved only be specially authorized personnel possessing the tool.

The enclosure is easily assembled for installation of the desired terminal or splicing equipment and for the making of connections, and readily disassembled for replacing apparatus or altering connections. For initial assembly of the enclosure at the site, the lower cover and rear housing section may first be fastened together and then slipped over the cable emerging from the ground, or the two parts may be positioned on each side of the upstanding cable and then brought together and connected. At this juncture, the installers have complete access from all sides to the various conductors drawn up from the buried cable. Later, the upper rear housing section can be placed on and fastened to the lower rear housing section. At this stage the three parts of the enclosure can be secured into a subassembly by fasteners passing through overlapping portions of all three. The terminal mounting plate is connected to the upper rear section, and locked in position by tightening a locking bolt with the special tool. The closure is completed by fastening the upper front cover to the upper rear housing section.

If desired, the components of the enclosure may be formed into other subassemblies for initial installation at the site. For example, the lower and upper rear housing sections could first be joined into a subassembly and placed on one side of upstanding cable it this meets the particular needs of the installer. Accordingly, the enclosure accommodates the requirements of the installation.

Later disassembly is accomplished by initially removing the upper front cover. In the preferred embodiment, unless the service personnel are specially authorized, this is the only disassembly that is permitted. Only if the special tool is available can the locking bolt be unfastened and the terminal mounting plate opened to expose the connections on the rear side of the plate and in the rear compartment. Also, only then are the bolts connecting the upper and lower housing sections accessible to allow removal of the upper rear housing section, thus permitting full unimpeded access to all of the cable and service wires in the enclosure.

Accordingly, it is an object of this invention to provide an improved enclosure for electrical apparatus associated with a buried cable assembly which facilitates both installation and maintenance requirements.

It is another object to provide a buried cable terminal enclosure which is easily disassembled by approved persons, yet disassembled only with great difficulty by others.

The foregoing and other objects and advantages of the invention will appear from the following description. In the description reference is made to the accompanying drawings which form a part hereof, and in which there is shown by way of illustration and not of limitation a preferred embodiment of the invention. Such embodiment does not represent the full scope of the invention, but rather the invention may be employed in different embodiments, and reference is made to the claims herein for interpreting the breadth of the invention.

BRIEF DESCRIPTION OF THE DRAWINGS

FIG. 2 is a front view of the enclosure of FIG. 1 with parts cut away and removed;

FIG. 3 is a side view of the enclosure of FIG. 1;

FIG. 4 is a view in cross section taken along the plane of the line 4—4 of FIG. 3;

FIG. 5 is a view in cross section taken along the plane of the line 5—5 of FIG. 2;

FIG. 6 is a view in cross section taken along the plane of the line 6—6 of FIG. 3;

FIG. 7 is a view in cross section taken along the plane of the line 7—7 of FIG. 3; and FIG. 8 is a plan view of one end of a flexible protective shield used in the enclosure of FIG. 1.

DESCRIPTION OF THE PREFERRED EMBODIMENT

Figure 1:
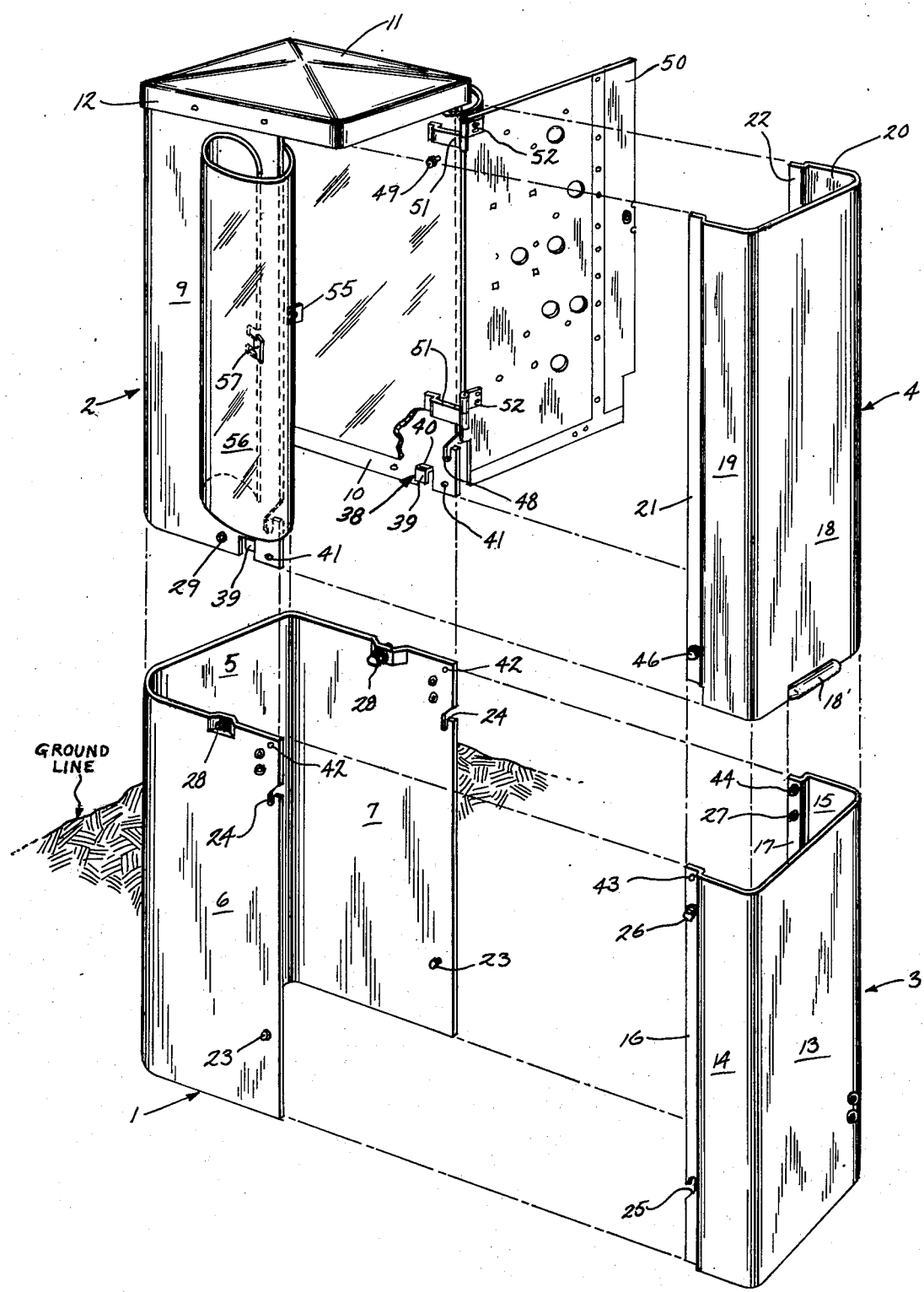
FIG. 1 is an exploded view in perspective with parts cut away of an enclosure which incorporates the present invention.

Referring to the drawings, the enclosure includes a housing assembled from four main elements. There is a rear housing assembly formed from a lower rear housing section 1 and an upper rear housing section 2, and there are lower and upper front covers 3 and 4, respectively. All four main elements of the enclosure are substantially channel-shaped, and consequently each of them comprises a web and spaced flanges extending from the opposite sides of the web.

Specifically, the lower housing section 1 includes a vertically elongated web 5 having vertically elongated forwardly projecting flanges 6 and 7, and the upper housing section 2 includes a vertically elongated web 8 having vertically elongated forwardly projecting flanges 9 and 10. A cap 11 has a depending skirt 12 around its entire periphery and the skirt 12 is riveted to the upper ends of the web 8 and flanges 9 and 10 of the upper housing section. The cap 11 projects forwardly of the upper housing section 2 to receive the upper cover 4 and thereby function as a roof for the enclosure.

The lower front cover 3 includes a vertically elongated web 13 with vertically elongated rearwardly projecting flanges 14 and 15 which terminate in inwardly offset mounting portions 16 and 17, respectively. The upper front cover 4 also includes a vertically elongated web 18 with vertically elongated rearwardly projecting flanges 19 and 20 which have inwardly offset mounting portions 21 and 22, respectively. A lowered handle 18' is formed integral with the lower edge of the web 18.

The lower front cover 3 is adapted to be joined to the lower rear housing 1. For this purpose, each of the lower housing flanges 6 and 7 mounts an inwardly projecting riveted lug 23 and is provided with a guideway 24. Each of the mounting portions 16 and 17 of the lower cover 3 has a guideway 25, at the level of the lugs 23, and a bolt 26 held in a nut 27 secured at the level of the guideways 24. In a known manner, each of the guideways 25 of the lower cover 3 receives one of the lugs 23 of the lower housing section 1, and each of the guideways 24 of the lower housing section 1 receives the shank of one of the bolts 26. Tightening the bolts 26 will then secure the lower cover 3 to the lower housing section 1 with the ends of the flanges 6 and 7 overlapping the mounting portions 16 and 17, respectively.

The lower and upper rear sections 1 and 2 are adapted to be joined together and such connection is made by threading a pair of headed bolts 28 into cooperating nuts 29. As best seen in FIGS. 1 and 6, the upper edge of each of the flanges 6 and 7 of the lower housing section 1 is offset to form a bracket 30 including a support portion 31 spaced from the plane of the respective flange 6 and 7, and connecting portions 32. The support portion 31 is provided with a central opening 33 through which the bolt 28 is passed. The bolt 28 includes a head 34 formed with an integral washer 34', a reduced diameter shank portion 35, and a threaded end 36. A washer 37 is mounted on the shank and has a central opening less than the diameter of the threaded end so that the bolt 28 is held captive against axial removal from the bracket 30. The bolt 28 is so proportioned that the weight of the headed end of the bolt is significantly greater than the weight of the shank 35 and threaded end 36. Then, when the bolt 28 is loose in the bracket 30 the headed end will hang downwardly and move the threaded end 36 to within the space defined by the support portion 31 and the connecting portions 32. The nuts 29 which receive the bolts 28 are secured adjacent the lower edges of the flanges 9 and 10 of the upper housing section 2 about openings provided therein. Because the interior of the enclosure will often be crowded with cable, the installer may be very restricted in his efforts to tighten or loosen the bolts 28. However, the integral washer 34' on the head 34 of the bolt permits the use of an open end wrench with the integral washer 34' providing a stop against which the side of the wrench can be seated.

Positioning tabs 38 are provided on the web 8 and flanges 9 and 10 of the upper housing section 2 by offsetting a portion of the bottom edge of each. The tabs 38 are each generally L-shaped and include a depending portion 39 having a surface which opposes the inner surface of the respective web 8 or flanges 9 and 10. A connecting portion 40 joins each depending portion to its respective web 8 or flange 9 or 10. The tabs 38 facilitate placement of the upper housing section 2 onto the lower housing section 1, insure proper alignment, and maintain a stable connection between them. When connected, there is a partial overlap between the lower and upper housing sections 1 and 2. The upper edges of the web 5 and flanges 6 and 7 of the lower housing section 1 will contact the connecting portions 40 and will be disposed between the depending tab portion 39 and the opposing inner surfaces of the web 8 and flanges 9 and 10 of the upper housing section 2. The tabs 38 formed on the flanges 9 and 10 of the upper housing section 2 are carefully sized so that a snug fit will result. The space between the depending portion 39 and the web 8 for the tab 38 formed on that web 8 of the upper housing section 2 is slightly oversized so that the upper housing section 2 may be placed on the lower housing section 1 by first tilting the upper housing section 2 rearwardly and guiding the web 5 of the lower housing section into place. Thereafter, the upper housing section 2 is tilted forward to engage the flanges 6 and 7 of the lower housing section between the tabs 38 on the flanges 9 and 10 of the upper housing section 2 to complete the positioning of the two housing sections. As this assembly is carried out, the bolts 28 will not interefere because the threaded ends 36 will be within the space defined by the brackets 30. The bolts 28 can be threaded into the nuts 29 to secure the upper housing section 2 in place upon the lower housing section 1.

Additional retention means are employed for maintaining an assembled relation between the lower and upper housing sections 1 and 2 and the lower front cover 3. Specifically, an opening 41 is provided adjacent the bottom and front edge of each of the flanges 9 and 10 of the upper housing section 2 in the area which overlaps with the respective flanges 6 and 7 of the lower housing section 1. Such flanges 6 and 7 are provided with openings 42 aligned with the openings 41. Finally, similar aligned openings 43 are provided adjacent the upper ends of the mounting portion 16 and 17 of the lower cover 3 and nuts 44 are attached to the inner surface of each of said mounting portions 16 and 17 about the openings 43. Thus, when the housing sections 1 and 2 and the lower cover 3 are assembled together with the openings 41, 42 and 43 in alignment, a bolt 45 may be passed through and threaded into each nut 44. A subassembly is thereby formed consisting of the rear housing sections 1 and 2 and the lower cover 3. The outer housing of the enclosure is completed by attaching the upper cover 4.

The upper front cover 4 is fastened to the upper housing section 2 by means of a pair of bolts 46 which are threaded into nuts 47 mounted about openings in the mounting portion 21 and 22 of the upper cover 4. The shanks of the bolts 46 are received in guideways 48 formed in the front edges of the flanges 9 and 10 of the upper housing section 2. The top of the upper cover 4 is restrained between the skirt 12 of the projecting portion of the cap 11 and lugs 49 which are riveted to the flanges 9 and 10 and provide a stop for the ends of the mounting portions 21 and 22 of the upper cover 4. When in place, the lower edge of the web 18 and flanges 19 and 20 of the upper cover 4 will overlap the corresponding portions of the lower cover 3.

With the front cover assembled on the subassembly, a hollow housing is formed. The overlapping relationship of the enclosure components results in a structure which repels weather conditions that are damaging to the contents of the housing.

Referring to FIGS. 1, 2 and 5, a terminal mounting plate 50 is pivotally mounted to the upper housing section 2. The terminal mounting plate 50 is removably connected on one of its sides on a pair of hinge brackets 51 which are riveted to the flange 10 and which carry upstanding pins which receive hollow hinge members 52 mounted at the edge of the mounting plate 50. The hinge brackets 51 are offset to accommodate the mounting portion 22 of the upper cover 4. Adjacent its other edge, the mounting plate 50 is provided with a captive locking bolt 53 which can be threaded into a nut 54 held in a bracket 55 riveted to the opposite flange 9 of the upper housing section 2. The bracket 55 is also offset so as to accommodate the mounting portion 21 of the upper cover 4.

The terminal mounting plate 50 is movable between an open position such as shown in FIG. 1 and a closed position such as illustrated in FIG. 2. When the mounting plate 50 is in its closed position, it divides the interior of the enclosure formed by the upper housing section 2 and the front cover 4 into forward and rear compartments. The mounting plate 50 is adapted to mount terminal blocks and other accessories for the splices and connections within the enclosure.

The captive locking bolt 53 has a special slotted head which will accommodate a nonstandard tool and which cannot otherwise be opened. Thus, the mounting plate 50 when closed can be effectively locked to the upper housing section 2, with a special tool being required to tighten or withdraw the bolt 53. Such locking of the mounting plate 50 is an important security feature of the enclosure. In order to remove the upper housing section 2 from the lower housing section 1, the bolts 28 must be loosened from inside the enclosure. However, access to the headed ends 34 of the bolts 28 can be achieved only after the terminal mounting plate 50 has been pivoted to its open position. Consequently, one seeking to unfasten the upper rear housing section 2 must possess the special tool required for unlocking the terminal mounting plate 50.

A protective flexible plastic shield 56, preferably formed of a polyethylene material, is attached to the upper housing section 2. The shield 56 substantially covers the interior surface area of the upper housing section 2, and the ends of the shield 56 extend forwardly so that they may surround the terminal mounting plate 50 and all apparatus mounted on it and within the forward compartment. The ends of the protective shield 56 are overlapped before the upper cover 4 is attached to prevent any pinching of wires or other damage to the contents while the upper cover 4 is being positioned on and fastened to the upper housing section 2.

Means are provided to hold the ends of the shield 56 out of the way while work is being performed in the area behind and in front of the mounting plate 50. Referring to FIG. 8, each end of the shield 56 is die cut to form a T-shaped tab portion 57 at the edge of the shield. A rectangular opening 58 is formed in the shield 56 inwardly of the edge. As seen in FIG. 1, the ends of the shield 56 can be rolled back and the tabs 57 inserted in the respective openings 58 to hold the shield 56 open.

In use, the enclosure would normally be shipped to its intended site in an assembled form. Loosening of the various bolts will permit fast disassembly of the entire enclosure at the site. Depending upon the requirements of the site, the lower cover 3 and lower housing section 1 may first be joined together and then slipped over the cable emerging from its buried location, or the lower housing section 1 may first be positioned in connection with the cable and the lower cover 3 then joined to it. The latter alternative is particularly useful where the enclosure is being used to replace an existing enclosure and it is not possible to slip the assembled lower housing section 1 and lower cover 3 over the ends of the cables. In either event, the design of the lower housing section 1 and lower cover 3 when in place permits 360° access to the entire upper working area during installation. The splicer has room to open the sheath on large cables and to make direct splices, or place lead sleeves on the cables, or to mount other apparatus. The flat bottom formed by the lower rear housing section 1 and the lower cover 3 facilitate the mounting of the enclosure on a concrete pad or slab.

After work on the cable loop or cable ends has been completed, the upper housing section 2 would be positioned on and secured to the lower housing section 1 as previously described. The upper housing section 2 has a plurality of clips 58 which may be used to secure a cable loop or splices in tiers by means of cable ties. Once the permanent and semi-permanent splices and connections have been completed in the area of the rear compartment, the mounting plate 50 would be attached on the pin hinge brackets 51. The plate 50 has a pattern of holes to accommodate a variety of terminal block styles and sizes. Once the proper terminal blocks are placed on the mounting plate and spliced to the selected cables, the mounting plate 50 would be locked into position with the captive bolt 53. All connections behind the closed plate 50 would be those which would require special authorization in order to change. Only those connections which would involve routine service changes would be accomplished in the compartment in front of the mounting plate 50. Thus, unless a serviceman had special authorization he could not obtain access to the cables or connections behind the locked mounting plate 50 because he would not be provided with the special tool required to open it. This also prevents disassembly of the upper housing section 2 from the lower housing section 1 by unauthorized personnel.

The installation is completed by securing the upper cover 4 in place. Thereafter, the upper cover 4 can be removed by service personnel to make the routine changes in service connections which can be accomplished in the front compartment, and the remainder of the enclosure will function as a substantially integral unit. The lowered handle 18' provides a convenient hand hold for lifting the upper cover 4 during its removal.

An enclosure in accordance with this invention provides improved flexibility during periods of installation and maintenance of the splices and connections associated with buried utility cables. Although the enclosure is capable of ready assembly and disassembly it is relatively tamper resistant. Thus, the disclosed construction provides an enclosure that is durable and secure, but also easily utilizable by authorized workers.

I claim:

1. An enclosure for electrical apparatus associated with a buried cable installation, comprising:
    a rear housing assembly including channel-shaped upper and lower housing sections,
    both housing sections including a web and a pair of spaced forwardly projecting flanges extending from opposite sides of the web;
    the bottom of the web and flanges of the upper housing section overlapping the top of the web and flanges of the lower housing section;
    said rear housing assembly further including means for removably joining the upper housing section to the lower housing section;
    a lower channel-shaped front cover having a web portion and a pair of spaced flanges extending rearwardly from opposite sides of the web;
    the ends of the flanges of the lower housing section overlapping the ends of the flanges of the lower cover,
    first means for releasably attaching the flanges of the lower cover to the corresponding flanges of the lower housing section;
    a cap fastened to the top of said upper housing section and projecting forwardly therefrom to overlie the top of an upper cover;
    a single upper channel-shaped cover completing the enclosure and having a web and a pair of spaced rearwardly projecting flanges extending from opposite sides of the web;
    second means for releasably attaching the upper cover to the upper housing section; and
    means for connecting the assembled upper and lower housing sections and lower cover into a subassembly to which the upper cover can be attached, said means for connecting comprising a removable fastener extending through the overlapping flanges of the upper and lower housing sections and the lower cover.

2. An enclosure in accordance with claim 1, wherein:
    said first and second releasably attaching means each includes a nut attached to the flanges of one of said housing sections and cover with a bolt threaded into the nut, and a guideway formed in the flanges of the other of said housing sections and cover to receive the shank of the bolt.

3. An enclosure in accordance with claim 1, wherein:
    said means for removably joining the housing sections comprises a mounting nut disposed on each flange of the upper housing section in alignment with an opening therethrough in the area of the overlap, and
    a headed bolt is mounted on each flange of the lower housing section for engagement with a respective one of said nuts,
    the headed ends of said bolts being disposed in the space between the flanges of said lower housing section.

4. An enclosure in accordance with claim 3, together with:
    a mounting plate pivotally connected to said upper housing section in the space between the flanges of said upper housing section,
    said mounting plate being movable between an open position and a closed position in which the plate is disposed parallel to the web of said upper housing section and forward of said headed bolts; and
    locking means for securing said plate in its closed position to thereby restrict access to the headed ends of said bolts.

5. An enclosure for electrical apparatus associated with a buried cable installation, comprising:

a rear housing assembly including channel-shaped upper and lower housing sections, both housing sections including a web and a pair of spaced forwardly projecting flanges extending from opposite sides of the web;

the lower edge of the web and flanges of the upper housing section overlapping the upper edge of the web and the flanges of the lower housing section;

positioning tabs disposed inwardly of the web and of each of the flanges of the upper housing section, each of said positioning tabs having a depending portion which includes a surface which opposes the inner surface of the respective one of the web and flange and a connecting portion joining the tab to the respective one of the web and flange, whereby the upper edge of the lower housing section can be placed in contact with the connecting portion and between said opposing surfaces;

said rear housing assembly further including means for removably joining the upper housing section to the lower housing section;

a lower channel-shaped front cover having a web portion and a pair of spaced flanges extending rearwardly from opposite sides of the web;

the ends of the flanges of the lower housing section overlapping the ends of the flanges of the lower cover, first means for releasably attaching the flanges of the lower cover to the corresponding flanges of the lower housing section;

a cap fastened to the top of said upper housing section and projecting forwardly therefrom to overlie the top of an upper cover, a single upper channel-shaped cover completing the enclosure having a web and a pair of spaced rearwardly projecting flanges extending from opposite sides of the web;

second means for releasably attaching the upper cover to the upper housing section; and means for connecting the assembled upper and lower housing sections and lower cover into a subassembly to which the upper cover can be attached, said means for connecting comprising a removable fastener extending through the overlapping flanges of the upper and lower housing sections and of the lower cover.

6. An enclosure in accordance with claim 5, wherein:

each of said tabs is formed integrally with said upper housing section as an offset portion of the lower edge of the web and flanges of said upper housing section.

7. In an enclosure for electrical apparatus associated with a buried cable installation including a lower hollow housing, an upper rear housing section and an upper front cover adapted to be mounted to each other and to the top of said lower houusing, and a flexible plastic shield extending along the inner perimeter of said upper rear housing section and having ends extending outwardly therefrom, the improvement wherein:

each end of said shield has an integral T-shaped tab formed adjacent the outer edge and an opening formed at a point spaced inwardly of said edge.

8. A terminal enclosure for a buried cable installation comprising:

a hollow housing formed by connecting front covers to a rear housing assembly;

said rear housing assembly including an upper section and a lower section;

a terminal mounting plate attached to said rear housing assembly to divide said housing into forward and rear compartments;

a pair of bolts mounted on said lower section and each having a headed end and a threaded end, the headed end of each bolt being disposed within said hollow housing and rearwardly of said terminal mounting plate; and a pair of nuts mounted on said upper section about openings therein, and being adapted to receive the threaded ends of said bolts.

9. A terminal enclosure in accordance with claim 8, wherein:

said terminal mounting plate is pivotally connected along one side to said upper section and is adapted to be locked on another side to said upper section, whereby access to the headed ends of said bolts is achieved by unlocking and opening said terminal mounting plate.

10. A terminal enclosure for a buried cable installation, comprising:

a hollow housing formed by connecting front covers to a rear housing assembly;

said rear housing assembly including an upper section and a lower section;

a terminal mounting plate attached to said rear housing assembly to divide said housing into forward and rear compartments;

said lower section having a pair of brackets disposed on opposite sides thereof interior of said housing, each of said brackets including a support portion spaced from the side of said lower section and provided with a bolt-receiving opening;

a pair of bolts mounted on said lower section in said brackets and each having a headed end and a threaded end, the headed end of each bolt being disposed within said hollow housing and rearwardly of said terminal mounting plate, each bolt having a shank of reduced diameter joining its headed end and its threaded end;

a washer disposed about each shank between the support portion of said bracket and the threaded end to prevent axial removal of said bolt from said bracket; and a pair of nuts mounted on said upper section about openings therein, and being adapted to receive the threaded ends of said bolts.

* * * * *